United States Patent [19]

Forte et al.

[11] 4,247,521

[45] Jan. 27, 1981

[54] LIQUID-LIQUID CONTACTING SYSTEM

[75] Inventors: Paulino Forte, Yonkers; George S. Somekh, New Rochelle, both of N.Y.

[73] Assignee: Union Carbide Corporation, New York, N.Y.

[21] Appl. No.: 66,853

[22] Filed: Aug. 15, 1979

Related U.S. Application Data

[63] Continuation of Ser. No. 862,223, Dec. 19, 1977, abandoned, which is a continuation of Ser. No. 651,854, Jan. 23, 1976, abandoned.

[51] Int. Cl.³ .............................................. B01D 12/00
[52] U.S. Cl. .................................... 422/256; 202/158
[58] Field of Search ........ 261/114 R, 114 A, 114 TP, 261/114 TC; 202/158; 196/14, 52; 423/658.5; 422/256; 23/293

[56] References Cited

U.S. PATENT DOCUMENTS

| | | | |
|---|---|---|---|
| 2,632,720 | 3/1953 | Perry | 134/25 |
| 2,647,855 | 8/1953 | Grunewald et al. | 196/14.42 |
| 2,647,856 | 8/1953 | Grunewald et al. | 196/14.41 |
| 2,752,229 | 6/1956 | Brown . | |
| 2,762,692 | 9/1956 | Spitz et al. | 261/114 |
| 2,909,414 | 10/1959 | Gerhold et al. . | |
| 3,109,870 | 11/1963 | Kuhn et al. | 260/705 |
| 3,125,614 | 3/1964 | Mayfield et al. | 261/114 |
| 3,356,459 | 12/1967 | Hann et al. . | |
| 3,364,988 | 1/1968 | Hartman | 165/85 |
| 3,410,540 | 11/1968 | Bruckert | 261/113 |
| 3,632,315 | 1/1972 | Vitti | 196/14.52 |
| 3,792,843 | 2/1974 | Stage | 261/114 |
| 3,958,964 | 5/1976 | Koch | 55/186 |

FOREIGN PATENT DOCUMENTS 724107 12/1965 Canada .
2158538 6/1973 Fed. Rep. of Germany .

Primary Examiner—Hiram H. Bernstein
Attorney, Agent, or Firm—Dominic J. Terminello

[57] ABSTRACT

A liquid-liquid contacting tray comprising a perforated deck providing a major portion of the tray surface area and continuous phase liquid transfer means comprising a settling section extending outwardly from the tray deck on one side of the tray and joined in closed flow communication with a smaller cross-sectioned pressure drop section extending outwardly from the tray deck on the other side of the tray to provide a sudden contraction in cross-sectional area from the settling section to said pressure drop section substantially in the plane of the perforated deck for reduction of pressure in the liquid flowed therethrough.

22 Claims, 11 Drawing Figures

LIQUID-LIQUID CONTACTING SYSTEM

CROSS-REFERENCE TO RELATED APPLICATIONS

This is a continuation of Ser. No. 862,223 filed Dec. 19, 1977, now abandoned which in turn is a continuation of Ser. No. 651,854 filed Jan. 23, 1976, now abandoned.

BACKGROUND OF THE INVENTION

This invention relates broadly to liquid-liquid contacting systems and more particularly to systems wherein perforated liquid-liquid contacting trays are employed.

In the practice of contacting immiscible liquids, as for example, in fractionation and extraction processes, it has been common practice in the art to employ vertically oriented contacting columns wherein a multiplicity of horizontal trays are mounted in vertically displaced relationship with respect to each other. These trays thus define a series of inter-tray spaces which constitute the contacting zones in the column wherein the respective liquid phases are brought together in intimate admixture for contacting. In operation, the heavier or denser phase is introduced at the top of the contacting column and the lighter or less dense phase at the bottom thereof, so that the difference in density constitutes a driving force causing the respective liquid phases to flow through the column. Contacted heavier phase liquid is removed from the system at the bottom of the tray column and contacted lighter phase liquid is removed at the top of the column.

The above type of contacting systems frequently employ trays of a kind known as "sieve trays" featuring a multiplicity of discrete perforations in the tray plate, or deck, through which liquid may flow. In operation, one liquid phase (the "discontinuous" phase) is dispersed as droplets as it flows through the perforated deck. The droplets thus formed rain through the other ("continuous") phase in the contacting zone between adjacent trays, collect and coalesce on the adjacent downstream tray, with coalesced discontinuous phase liquid being discharged at the other side of the downstream tray from the perforations therein. In this manner, the discontinuous phase liquid is serially flowed in the form of small droplets through all of the inter-tray contacting zones in the column. Simultaneously, the continuous phase liquid is flowed through the column in a generally countercurrent fashion and transferred between adjacent inter-tray contacting zones by means of channels or conduits associated with each tray. These continuous phase transfer means are termed "downcomers" when the heavier phase is continuous and flows vertically downwardly therethrough and "upcomers" when the lighter phase is continuous and flows vertically upwardly therethrough.

For the purpose of convenience in the ensuing discussion, the discontinuous phase liquid will be taken as referring to the heavier, or denser, phase and the continuous phase will be taken as referring to the lighter, or less dense, liquid phase. Under this terminology, the liquid transfer means associated with the contacting trays will be identified as "upcomers", i.e., these means serve to transfer the lighter continuous phase liquid from a lower inter-tray contacting zone below the given tray to a higher inter-tray contacting zone above the tray. It will be recognized that the foregoing terminology is intended for ease of description only and that the following discussion is in principle equally applicable to heavier continuous phase - lighter discontinuous phase sieve tray column contacting systems having downcomer means for transfer of the continuous phase liquid between adjacent inter-tray contacting zones.

In the sieve tray liquid-liquid contacting system, it is important that the height of the discontinuous phase liquid layer collecting on the perforated deck of the tray be sufficient to allow the droplets of discontinuous phase liquid discharged from the tray above and passed through the overlying contacting zone to substantially completely coalesce within the layer. Such provision insures that the discontinuous phase liquid will be essentially free of continuous phase liquid before again being discharged as droplets, thereby avoiding undue entrainment of the continuous phase liquid which may otherwise result in substantial backmixing of the latter.

Under the above backmixing conditions, the entrained continuous phase liquid is recirculated together with the discontinuous phase to the lower contacting zone through which the former phase has previously been passed. Backmixing of the discontinuous phase liquid can also occur in the sieve tray system if the linear velocity of the continuous phase through the upcomers is not sufficiently low to prevent entrainment of the discontinuous phase. Backmixing increases the liquid loading of the trays in the column and reduces the overall contacting efficiency of the system. When backmixing occurs to an excessive degree, the discontinuous and continuous phases may become interspersed in the contacted streams withdrawn at the respective ends of the column. The column is then said to be "flooded" and the system flow rates must be substantially reduced before proper flow conditions can be re-established.

In connection with the maintenance of a sufficient height of discontinuous phase liquid on the tray, it is desirable to avoid the occurrence of significant gradients in the discontinuous phase layer on the tray, such as may give rise to short-circuiting liquid flows through the perforated deck. Based on the foregoing, then, it is apparent that the coalesced discontinuous phase liquid layer on the sieve tray is preferably characterized by a height which is sufficient to allow essentially complete settling of the discontinuous liquid and disengagement of the continuous phase liquid therefrom, together with a substantially uniform distribution of the liquid layer on the tray deck to minimize adverse hydraulic effects which tend to lower the tray efficiency.

In the aforedescribed sieve trays, the height of the coalescent discontinuous phase liquid layer on the tray deck is determined by an overall pressure drop which is associated with the separate continuous and discontinuous liquid phases passing through the upcomer means and perforated deck of the tray, respectively. Accordingly, to assure stability of the tray during operation, it is necessary to design the tray deck with sufficient aggregate open area in the perforations thereof to accommodate variations in the liquid loading which may occur from one tray to another in the column while maintaining the constituent pressure drop across the tray deck at a level consistent with the desired height of coalescent liquid on the tray. Similarly, it is also necessary to design the upcomer means so that an adequate continuous phase pressure drop is provided in operation despite variations in liquid loading, while simultaneously maintaining the linear velocity of the continuous phase liquid flowing through the upcomer at a sufficiently low level to prevent entrainment of discontinuous phase liquid droplets from the lower contacting zone in the liquid passing through the upcomer to the upper contacting zone.

Sieve trays presently employed in the liquid-liquid contacting art are frequently designed so that the upper of any two adjacent trays has an imperforate portion of the tray deck positioned above the upcomers of the tray below. These imperforate areas serve to prevent droplets of discontinuous phase liquid from falling into the upcomer of the tray below. Trays of the prior art are typically constructed with upcomers sized so that the continuous phase liquid velocity in the upcomer will be lower than the terminal velocity of some arbitrarily small discontinuous phase liquid droplet, to prevent entrainment of the discontinuous phase from a lower contacting zone in the continuous liquid flowing through the upcomer to an upper adjacent contacting zone. Thus, discontinuous phase droplets falling into the upcomer from an overlying tray deck will bypass the lower tray. The provision of imperforate tray deck areas above upcomers of the adjacent lower tray thus prevents such bypassing and permits the upcomer to function as a settling or disengagement zone wherein discontinuous phase liquid from an underlying contacting zone separates from the continuous phase liquid being transferred, so that only the continuous phase liquid, substantially free of the discontinuous phase, is flowed to the contacting zone overlying the tray.

The foregoing arrangement, while effective in transferring essentially only continuous phase liquid between adjacent contacting zones, is characterized by large imperforate tray areas which constitute a significant portion of the total tray deck cross-sectional area. These imperforate areas thus decrease the amount of tray deck which can be utilized in the formation of droplets from the coalescent layer of discontinuous phase liquid on the tray. As a result, the provision of such imperforate areas to "shield" upcomers of the underlying tray tends to increase the size of the column which is necessary to achieve a requisite level of contacting in a given system.

Another type of widely employed prior art sieve tray involves a sandwich tray assembly comprising two superimposed closely-spaced perforated decks, each deck having a different open area. In such a tray assembly, fluid passes first through the upper deck having the lesser open area and subsequently through the lower deck having the greater open area, so that the first deck is associated with the greater portion of the total pressure drop across the tray assembly. In this manner, the assembly is intended to provide a higher liquid interface above the upper deck, which in turn allows more time for the continuous phase to disengage from the coalescing discontinuous phase and reduces undesirable backmixing. Nonetheless, such design significantly increases the cost as well as the complexity of the tray relative to those employing a single perforated deck.

From a structural standpoint, it has been the practice of the prior art to dispose beams extending transversely across the tray for support and mechanical strength. This is practical particularly in large scale columns, where many upcomers or downcomers are employed to reduce the lateral hydraulic and concentration gradients across the tray. However, such support members also occlude large portions of the tray surface, so that a significant amount of the tray's cross-sectional area is lost for contacting purposes.

Accordingly, it is an object of the present invention to provide an improved liquid-liquid contacting sieve tray which is easily and inexpensively fabricated, which utilizes a larger part of the tray deck for discontinuous phase liquid collection, coalescence and droplet formation and which is characterized by stable operation, uniform coalescent liquid distribution on the tray deck and high resistance to backmixing behavior under conditions of variant liquid flows.

It is a further object of the invention to provide an improved tray of the above type which is characterized by a small cross-sectional area requirement.

Other objects and advantages of the invention will be apparent from the ensuing disclosure and appended claims.

SUMMARY OF THE INVENTION

This invention relates broadly to liquid-liquid contacting systems wherein perforated liquid-liquid contacting trays are employed and more particularly to a liquid-liquid contacting tray for use in such systems.

Briefly, the invention comprises a liquid-liquid contacting tray with a horizontally disposed perforated deck providing a major portion of the tray surface area for discharge of coalesced discontinuous phase liquid at one side of the deck through the perforations therein from a layer of coalescent discontinuous phase liquid supported on the other side of the deck. At least one channelized liquid transfer means is provided, extending through the perforated deck as the sole means for transfer of continuous phase liquid from a contacting zone on the one side of the tray to a contacting zone on the other side thereof. Each liquid transfer means comprises a settling section formed by imperforate enclosing wall means extending vertically outwardly from the tray deck one side and open at the outermost end to provide an inlet to the settling section, for disengagement of the discontinuous phase liquid from the transferred continuous phase liquid. A pressure drop section is vertically aligned with the settling section, formed by enclosing wall means extending vertically outwardly from the tray deck other side and imperforate at least along the base part thereof adjacent the perforated deck. The pressure drop section has a smaller cross-sectional area than the settling section and is joined in closed flow communication therewith to provide a sudden contraction in cross-sectional area from the settling section to the pressure drop section substantially in the plane of the perforated deck for reduction of pressure in the liquid flowed therethrough. At least one fixedly positioned liquid discharge opening is provided in the outer part of the pressure-drop section for passage of transferred liquid to the contacting zone on the other side of the tray. The liquid transfer means further includes imperforate cover means disposed at the outer end of the pressure-drop section for vertical sealing thereof against discontinuous phase liquid in the contacting zone on the other side of the tray.

In one preferred embodiment of the above-described invention, a plurality of liquid transfer means is provided, aligned in rows extending across the tray and transversely spaced in parallel relationship to each other. The liquid transfer means in each row comprise a single settling section whose enclosing wall means comprise side walls longitudinally extending across the tray and transverse end walls disposed at right angles with respect to the side walls whereby each such settling section has a rectangular cross-section over its entire vertical extent. Each of these settling sections is joined with a multiplicity of longitudinally spaced apart pressure drop sections. In this arrangement, the enclosing wall means of the pressure drop section also comprise longitudinally extending side walls and transverse end walls disposed at right angles with respect to the side walls whereby each pressure drop section has a rectangular cross-section over its entire vertical extent. This preferred arrangement is particularly suited to large diameter contacting trays and serves to minimize lateral hydraulic and concentration gradients on the tray surface which would otherwise severely adversely affect the contacting efficiency of the tray.

In accordance with the invention, it has been found that the provision of a continuous phase liquid transfer means of the character described, featuring discrete settling section and pressure drop section segments, permits highly efficient disengagement of the discontinuous phase from the transferred liquid in the settling section. At the same time a pressure drop is provided across the liquid transfer means which allows the height of the coalescent discontinuous phase liquid layer collecting on the perforated deck of the tray to be maintained at a level sufficient to insure substantially complete coalescence within the layer, even under variant liquid flow conditions in the contacting system.

DESCRIPTION OF THE PREFERRED EMBODIMENTS

Figures 1, 2:
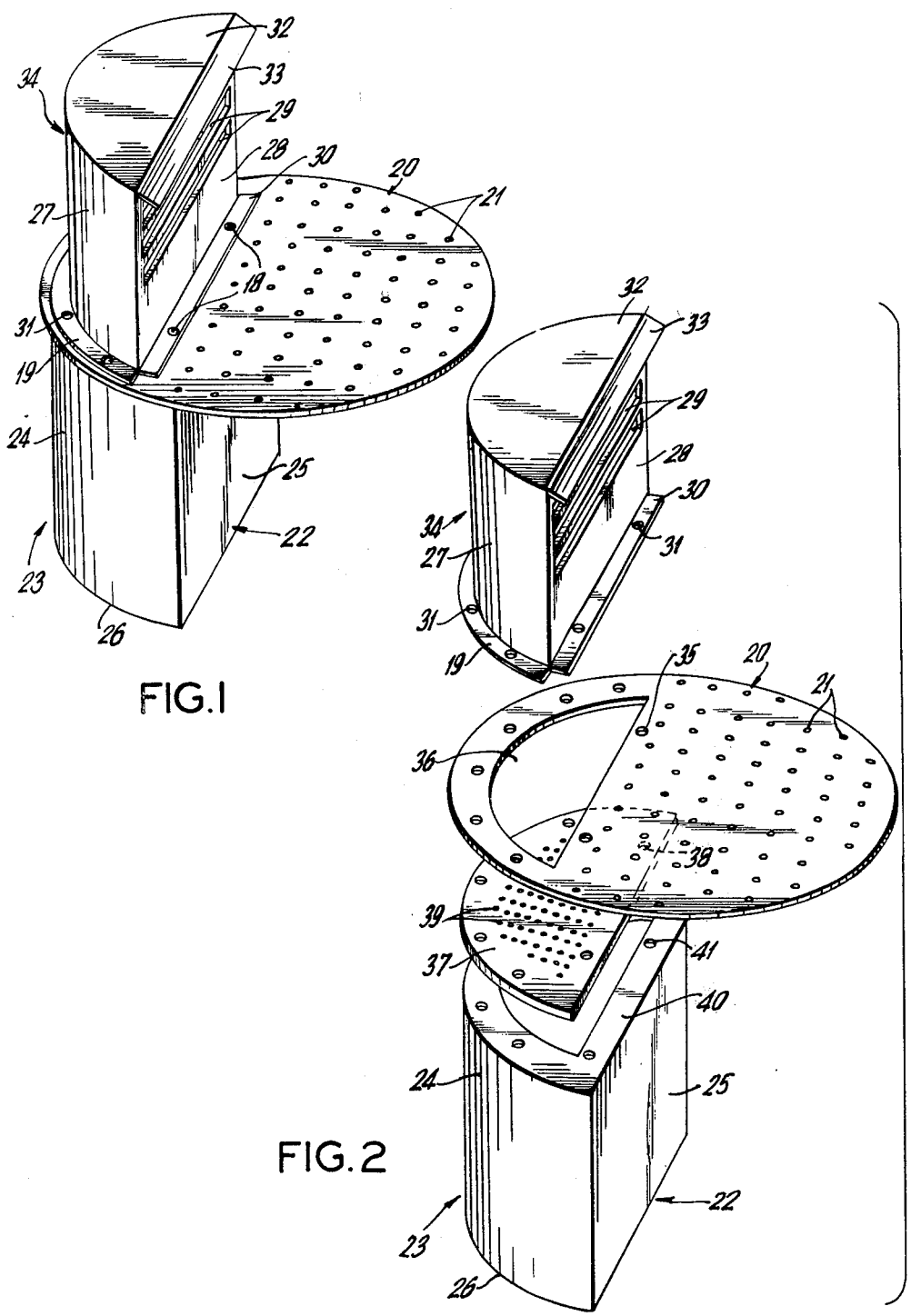
FIG. 1 is an isometric drawing of a liquid-liquid contacting tray according to one embodiment of the invention featuring a single upcomer continuous phase liquid transfer means.
FIG. 2 is an exploded isometric view of the FIG. 1 apparatus, showing the interior features of the liquid transfer means.

Referring now to the drawings, FIG. 1 is an isometric drawing of a liquid-liquid contacting tray according to one embodiment of the invention featuring a single upcomer continuous phase liquid transfer means. This tray configuration is particularly suitable for use in small, e.g. 10–20 inch diameter contacting columns, such as are used for pilot plant and small volume commercial operations. The illustrated tray when mounted in a contacting column in the orientation shown—i.e., with the settling section 23 extending vertically downwardly and the pressure drop section 34 extending vertically upwardly—is suitable for the handling of liquids comprising a lighter continuous phase and a heavier dispersed, or discontinuous, phase, with the liquid transfer means 22 functioning as an upcomer. The tray would also be employed in contacting columns wherein a heavier continuous liquid phase and a lighter discontinuous liquid phase are contacted, in which case the contacting tray could be mounted in the column in an orientation which is vertically inverted with respect to that shown in the drawing, with the liquid transfer means functioning as a downcomer. It will thus be understood that the tray of this invention, as described in the preceding Summary, may advantageously be deployed in either mode, and that references to "upcomers" or "upcomer liquid transfer means" as used in the ensuing description are intended for convenience only and are not to be construed in any limiting sense as regards the orientation of the tray which may be employed in actual use.

The liquid-liquid contacting tray shown in FIG. 1 comprises a horizontally disposed tray deck or plate 20, featuring a multiplicity of discrete perforations 21 formed for example by drilling or punching and distributed in a regular pattern across the tray deck. The perforated deck provides a major portion, i.e., greater than 50%, of the tray surface area for discharge of coalesced discontinuous phase liquid at one side thereof (the bottom side in the orientation shown in the drawing) through the perforations in the deck from a layer of coalescent dicontinuous phase liquid supported on the other side of the tray deck (the top side in the orientation shown in the drawing). The "coalescent discontinuous phase liquid layer" as referred to here is the layer of discontinuous phase—containing liquid forming on the tray deck during operation and includes the substantially clear phase, coalesced discontinuous liquid layer adjacent the tray surface and also the overlaying emulsion layer formed by the collecting discontinuous phase liquid drops and the associated, entrapped interstitial continuous phase liquid. As used herein, the term "tray surface area" refers to the total cross-sectional area of the tray in the horizontal plane of the perforated deck.

A single channelized, i.e., enclosed passage, liquid transfer means 22 extends through the perforated deck 20 as the sole means for transfer of continuous phase liquid from a liquid-liquid contacting zone on the aforementioned one side of the tray to a contacting zone on the other side thereof. The liquid transfer means comprises a settling section 23 and pressure drop section 34, as previously mentioned. The settling section 23 is formed by imperforate enclosing wall means, including arcuate wall portion 24 and planar facing wall portion 25, which extend vertically outwardly from the tray deck one side. The settling section is open at the outermost end 26 to provide an inlet through which the liquid to be transferred enters the liquid transfer means. In the settling section, the discontinuous phase liquid is disengaged from the transferred continuous phase liquid.

The pressure drop section 34 of the liquid transfer means 22 is vertically aligned with the settling section, being formed by enclosing wall means including arcuate wall portion 27 and planar facing wall portion 28, extending vertically outwardly from the tray deck other side. In accordance with the invention, the enclosing wall means of the pressure drop section are imperforate at least along the base part thereof adjacent the perforated deck 20. Pressure drop section 34 has a smaller cross-sectional area than the settling section 23 and is joined in closed flow communication with the latter to provide a sudden contraction in cross-sectional area (taken here as referring to the cross-sectional area for vertical liquid flow, as measured in a horizontal plane, along the transferred liquid flow path) from the settling section to the pressure drop section substantially in the plane of the perforated deck 20. Such sudden contraction provides a head loss or reduction of pressure in the liquid flowed therethrough which is a significant portion of the overall pressure drop across the liquid transfer means. The function of the pressure drop section in the present invention is to provide sufficient frictional and head losses in the continuous phase to maintain a suitable height of discontinuous phase liquid on the perforated deck and to uniformly distribute the discharged liquid across the contacting zone. In some instances it may be desirable to provide for additional increase in the head loss across the pressure drop section by the disposition of constrictions such as baffles, perforated plates and the like inside the pressure drop section or at its inlet, in the region of the sudden contraction of cross-sectional area from the settling section to the pressure drop section.

As described above, the enclosing wall means of the pressure drop section are imperforate at least along the base part thereof adjacent the perforated deck. In the FIG. 1 embodiment of the invention, the arcuate wall portion 27 of the pressure drop section 34 is wholly imperforate over its entire vertical extent. The wall surface of planar facing wall portion 28 is imperforate over its inner, base part and has fixedly positioned liquid discharge openings 29 in its outer part for passage of the transferred liquid from the pressure drop section to the adjacent contacting zone on that side of the tray. The openings 29 comprise parallelly aligned slotted apertures in the planar wall portion 28 which permit the transferred liquid to be discharged in a substantially horizontal direction toward the contacting zone from the liquid transfer means. An imperforate cover 32 is disposed at the outer end of the pressure-drop section 34, for vertical sealing of the pressure drop section against discontinuous phase liquid in the adjacent contacting zone on that side of the tray. The cover means serves to prevent droplets of discontinuous phase liquid from falling through the upcomer and into the contacting zone from which the continuous phase liquid being transferred through the liquid transfer means has been derived. If such cover means were not present, discontinuous phase droplets falling into the liquid transfer means from an overlying tray deck would bypass the associated tray, and such bypassing, if extensive, may cause inefficient operation of the contacting column. The illustrated cover means comprises a plate member having a horizontally disposed flat section overlying and joined to the outermost ends of the pressure drop section enclosing wall means and a peripheral portion 33 depending away from the horizontal flat portion and toward the tray surface, for deflection of discontinuous phase liquid impinging on the cover means. The function of the downwardly depending lip is to prevent a discontinuous phase film from adhering to the outer part of the liquid transfer means in such manner as to flow into the interior of the liquid transfer means 22 through the discharge openings 29 in planar wall portion 28.

FIG. 2 is an exploded isometric view of the FIG. 1 apparatus, showing details of the interior construction. The elements of the FIG. 2 assembly are numbered correspondingly with respect to those of FIG. 1. The perforated track deck 20, as shown, features a generally segment-shaped aperture 36 which is enclosed on the upper side by pressure drop section 34 and on the underside by settling section 23. Positioned immediately below the aperture 36 is pressure drop plate 37, a flat plate member sized to cover the aperture, featuring a multiplicity of perforations distributed across that portion of the plate which is vertically in line with the aperture. The pressure drop plate thus is disposed substantially horizontally proximate the inlet of pressure drop section 34 at the sudden contraction from the settling section to the pressure drop section. The function of the pressure drop plate 37 is to provide further reduction of pressure in the liquid flowing into the pressure drop section of the liquid transfer means. As shown in the drawing, the sudden contraction is formed by the horizontally disposed closure wall segment 40 enclosing the periphery of the settling section 23 at its upper end. The entire tray structure is assembled by means of screw or bolt and nut fasteners (not shown), with the screws or bolts passing through the vertically aligned array of apertures 31, 35, 38 and 41 of the pressure drop section 34, perforated deck 20, pressure drop plate 37 and settling section 23, respectively.

Figures 3, 4:
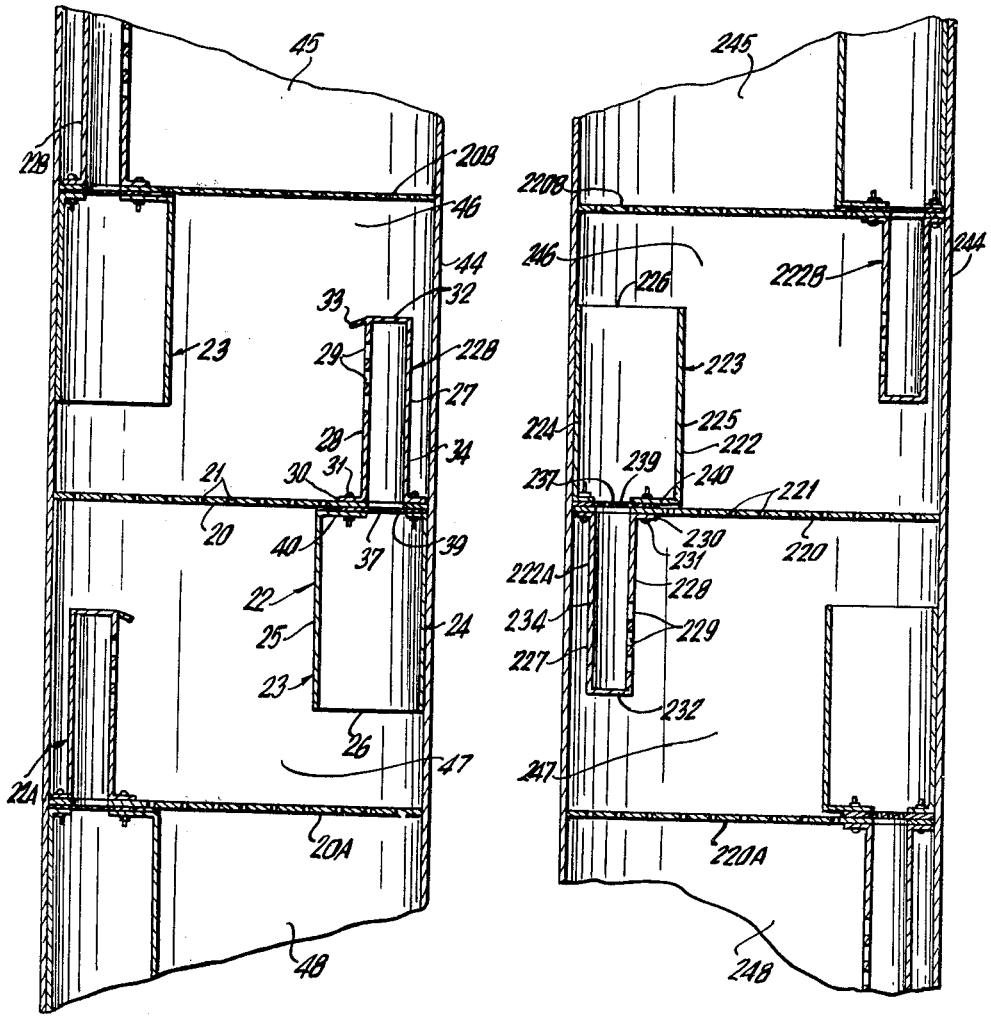
FIG. 3 is an elevational view of a section of a contacting column employing trays of a type as shown in FIGS. 1 and 2.
FIG. 4 is an elevational view of a section of another contacting column employing trays of a type similar to that shown in FIGS. 1 and 2.

FIG. 3 is an elevational view of a section of a liquid-liquid contacting column employing trays of a type as shown in FIGS. 1 and 2. The column comprises a vertically extending cylindrical casing 44 in which the trays are horizontally disposed and mounted in vertically displaced relationship with respect to each other, so as to form contacting zones between the adjacent trays. The middle tray in the drawing is numbered correspondingly with respect to the tray assemblies shown in FIGS. 1 and 2, for ease of reference. In the illustrative column arrangement, the liquid transfer means of adjacent contacting trays are disposed in laterally spaced relationship with respect to each other at opposite sides of the column, and the enclosing wall means of each settling section and each pressure drop section are vertically uniformly extended. As also shown the respective settling sections and pressure drop sections of adjacent contacting trays extending into the same contacting zone and terminating in that zone vertically overlap one another. Preferably, the sum of the heights (vertical extent) of the settling section and the laterally spaced pressure drop section extending into the same contacting zone is at least equal to the vertical spacing between the adjacent trays. Such lateral spacing and vertical dimensions permit highly efficient use of the associated liquid-liquid contacting zone by the provision of an extended continuous phase liquid flow path through the contacting zone, from the discharge openings of the pressure drop section out into and across the inter-tray contacting space, and finally to the inlet of the settling section disposed in that zone.

The column shown in FIG. 3 is adapted to the contacting of a heavier discontinuous phase liquid with a lighter continuous phase liquid, such as may be employed for example in the extraction of aromatic hydrocarbons from petroleum feedstock streams containing aliphatic and aromatic hydrocarbons by glycol-based solvents. In operation, the discontinuous heavier phase liquid is introduced at the upper end of the column and dispersed in the form of droplets as it flows through the perforated decks of the respective trays in the column. The droplets rain through the continuous lighter phase in the contacting zone above the tray, collect and coalesce on the perforated deck thereof, with the coalesced discontinuous phase liquid being discharged at the other side of the deck from the perforations therein. In the column section shown, the discontinuous phase liquid passes serially through the contacting zones 45, 46, 47 and 48 and is sequentially discharged in the form of droplets from the respective perforated decks 20B, 20 and 20A from the layers of coalescent discontinuous phase liquid maintained on the upper sides of these decks. Simultaneously, the lighter continuous phase liquid is flowed through the column in a generally upward countercurrent fashion and transferred between the sequential inter-tray contacting zones 48, 47, 46, 45 by means of the upcomers 22A, 22 and 22B associated with the respective trays.

As discussed earlier herein, the height of the discontinuous phase liquid layer collecting on the perforated deck of the tray should be sufficient to allow adequate coalescence of the droplets of discontinuous phase liquid within the layer. This is so that the discontinuous phase liquid will be sufficiently free of continuous phase when it is discharged as droplets from the perforations in the deck, thereby avoiding undue entrainment of the continuous phase liquid which may otherwise result in detrimental backmixing. The height of the coalescent discontinuous phase liquid layer on the tray deck is in turn determined by the total pressure drop which is associated with the separate continuous and discontinuous liquid phases passing through the liquid transfer means and perforated deck of the tray, respectively. In order to assure operating stability of the tray, the tray deck must be designed with sufficient aggregate open (perforation) area to accommodate liquid-loading variations in the column, while maintaining the discontinuous phase pressure drop across the tray deck at a level consistent with the desired height of coalescent liquid on the tray. The requisite open area of the perforated deck may be determined in a conventional manner by experiment and/or correlation to provide specific perforation diameters and perforation spacings (pitch) which permit efficient mass transfer and hydraulic behavior to be achieved under the design range of system operating conditions.

In the liquid transfer means of this invention, a continuous phase pressure drop is provided which is sufficient to maintain the desired height of the coalescent discontinuous phase liquid on the perforated deck during operation despite variant liquid loadings in the system. Simultaneously, the continuous phase liquid linear flow velocity in the liquid transfer means is maintained at a sufficiently low level to prevent entrainment of discontinuous phase liquid droplets in the transferred liquid. This is achieved by the above-described structure of the liquid transfer means, which provides a relatively large cross-sectional area in the settling section thereof. Since a change in the flow rate of either liquid phase in the contacting system will also change the flow resistance of that phase, the head of dispersed phase on the tray deck changes proportionally with any flow rate change. By means of the tray construction of the present invention, the head of the dispersed phase liquid may be closely controlled so that its variation is maintained at a suitably low level, to achieve high system efficiency over the full range of loading conditions.

With reference to FIG. 3, the pressure drop losses in the continuous phase liquid across the liquid transfer means 22 include (1) an entrance loss associated with the inlet 26 of the settling section 23; (2) a sudden contraction loss due to the abrupt reduction in cross-sectional liquid flow area of the liquid transfer means just below the perforated deck 21, where the closure wall segment 40 encloses the periphery of the settling section at its upper end to provide a sudden reduction in cross-sectional area from the settling section 23 to the pressure drop section 34; (3) an orifice plate loss associated with the flow of the transferred liquid through orifices 39 in the perforated plate 37 disposed substantially horizontally proximate the inlet of the pressure drop section 34; (4) a 90° turn loss in the pressure drop section 34 due to diversion of the transferred liquid from a substantially vertical upflow direction to a more or less horizontally directed outflow direction at the upper part of the pressure drop section, as the liquid is discharged from the liquid transfer means through the discharge openings 29 in the planar facing wall portion 28 of the pressure drop section 34; and (5) a sudden expansion loss across the liquid discharge openings 29 of the pressure drop section 34, as the transferred liquid passes from the pressure drop section into the contacting zone 46. The sum of these pressure drop losses (1)–(5) yields the value of the overall pressure drop across the tray associated with the continuous phase.

In some instances in the practice of the present invention, it may not be necessary to provide a pressure drop plate or analogous means in the liquid transfer means to provide the requisite continuous phase pressure drop loss. On the other hand, in some cases, where a high continuous phase liquid pressure drop across the liquid transfer means is required to provide the desired head of discontinuous phase liquid on the perforated deck, additional constrictions such as baffles, perforated plate members, and the like may be built into the pressure drop section to obtain sufficient total pressure drop. In addition, it is not essential in the broad practice of the invention that a 90° turn in the flow direction of the transferred liquid be achieved in the pressure drop section for discharge of the liquid; in some cases it may be desirable to discharge the transferred liquid from the liquid transfer means in a predominantly vertical direction. Nonetheless, it is generally preferred in practice to discharge the transferred liquid in a substantially horizontal direction, to provide for uniform distribution of the discharged liquid across the inter-tray contacting zone and to achieve a high degree of liquid-liquid contacting therein.

In addition to the continuous phase pressure drops described above, the total head of discontinuous phase on the contacting tray also depends on the pressure drop losses in the discontinuous phase liquid. The latter comprises the pressure drop required to overcome the interfacial tension between the respective liquids as the discontinuous phase liquid flows through the perforations in the tray deck, as well as the pressure drop which is required to cause the discontinuous phase to flow through the perforations in the deck at the desired linear velocity. The sum of these two pressure drop values constitutes the overall head of discontinuous phase on the tray attributable to both phases. The total head of discontinuous phase on the tray is then the sum of the overall continuous and discontinuous phase pressure drop values.

In the general practice of the invention, it is desirable to construct the settling section of the liquid transfer means with a relatively large cross-sectional area as compared to the cross-sectional area of the pressure drop section. Such provision is advantageous in order to provide a high degree of separation of the discontinuous phase from the continuous phase transferred liquid in the settling section and to provide a relatively high pressure drop due to the sudden contraction from the settling section to the pressure drop section. At the same time it is desirable to maintain the size of the liquid transfer means as small as possible consistent with good overall performance, in order to maximize the active perforated area of the tray. In this regard it is desirable to minimize the cross-sectional area of the pressure drop section. Nonetheless, narrow cross-sectioned pressure drop sections, e.g., having a width or diameter smaller than 1.0 inch, tend to produce excessively high continuous phase liquid flow velocities and these high velocities can in turn create excessive turbulence in the contacting zone which is detrimental to the contacting efficiency of the system. As a balance of all of the foregoing considerations, the ratio of the cross-sectional area of the pressure drop section to the cross-sectional area of the settling section is desirably in the range of 0.10 to 0.80. For example, in an 12-inch diameter column of the type shown in FIG. 3 with trays featuring single upcomer liquid transfer means, as employed for the extraction of aromatic hydrocarbons from a lighter continuous phase petroleum feedstock by dispersed tetraethylene glycol solvent, the ratio of the cross-sectional area of the pressure drop section to the cross-sectional area of the settling section may be on the order of 0.24, corresponding to a pressure drop section cross-sectional area of 5.8 inches$^2$ and a settling section cross-sectional area of 24.5 inches$^2$.

FIG. 4 is an elevational view of a section of another liquid-liquid contacting column employing trays of a type similar to that shown in FIGS. 1 and 2, but oriented so that the liquid transfer means function as downcomers to transfer the continuous phase liquid from the contacting zones on the top sides of the respective trays to the contacting zones on the bottom sides thereof. More particularly, the column comprises a vertically extending cylindrical casing 244 in which the trays 220A, 220 and 220B are horizontally disposed and mounted in vertically displaced relationship with with respect to each other to form the contacting zones 245, 246, 247 and 248. For ease of reference, the FIG. 4 drawings has been numbered correspondingly to FIG. 3, wherein similar type trays are shown in an upcomer orientation, by addition of 200 to the reference numbers for the corresponding common system elements. In the illustrative column arrangement, the liquid transfer means of adjacent contacting trays are disposed in laterally spaced relationship with respect to each other, at opposite sides of the column and the enclosing wall means of each settling section and each pressure drop section are vertically uniformly extended.

The contacting column as shown in FIG. 4 is suitable for the contacting of a lighter discontinuous phase liquid with a heavier continuous phase liquid, such as may be employed for example for extraction of pyridine from aqueous solution by benzene-dodecylphenol solvent. In operation, the discontinuous lighter phase liquid is introduced at the lower end of the column and dispersed in the form of droplets as it flows through the perforated decks of the respective trays in the column. The droplets rise through the continuous heavier phase in the contacting zone below each tray, collect and coalesce on the perforated deck thereof, with the coalesced discontinuous phase liquid being discharged at the top side of the deck from the perforations therein. In the column section shown, the discontinuous phase liquid passes serially through the contacting zones 248, 247, 246 and 245 and is sequentially discharged in the form of droplets from the respective perforated decks 220A, 220 and 220B from the layers of coalescent discontinuous phase liquid maintained on the lower sides of these decks. Simultaneously, the heavier continuous phase liquid is flowed through the column in a generally downward countercurrent fashion and transferred between the sequential inter-tray contacting zones 245, 246, 247 and 248 by means of the downcomers 222B, 222 and 222A associated with the respective trays.

Figure 5:
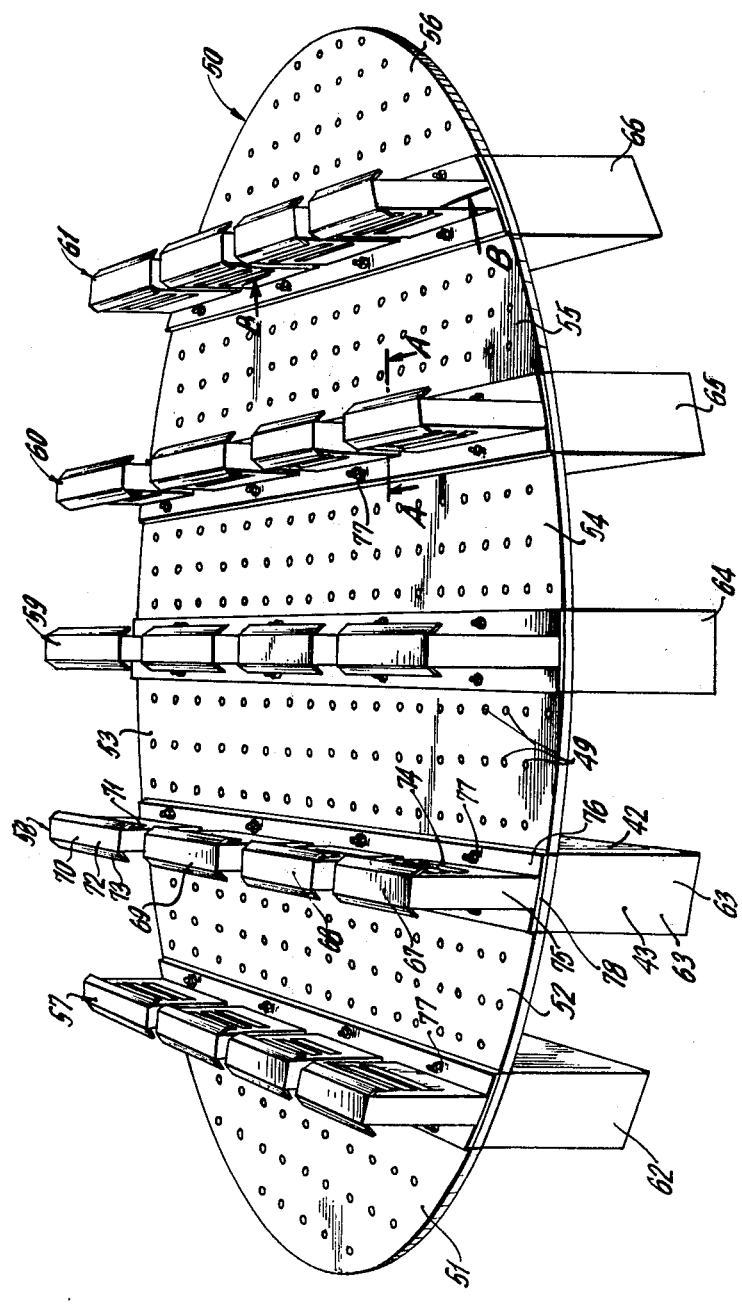
FIG. 5 is an isometric drawing of a contacting tray according to another embodiment of the invention featuring a plurality of liquid transfer means aligned in rows extending across the tray.

FIG. 5 is an isometric drawing of a contacting tray according to another embodiment of the invention featuring a plurality of liquid transfer means aligned in rows extending across the tray. In small diameter contacting column systems, as for example 1–4 ft. in diameter, it is generrlly adequate to provide only a single liquid transfer means for each contacting tray. However, as the column increases in diameter above such values the horizontal velocity of the continuous phase between the trays is correspondingly increased with the provision of only a single liquid transfer means for each contacting tray. Accordingly, the hydraulic and concentration gradients will also increase in relation to the diameter required. In order to produce the horizontal velocity to suitably low levels and to minimize the concentration and hydraulic gradients in large diameter columns, it is desirable to employ a plurality of continuous phase liquid transfer means with each tray.

The liquid-liquid contacting tray shown in FIG. 5 comprises a horizontally disposed perforated deck 50 providing a major portion of the tray surface area. The deck provides for discharge of coalesced discontinuous phase liquid at the bottom side thereof through the perforations 49 in the deck from a layer of coalescent discontinuous phase liquid supported on the top side of the deck. In this embodiment, a multiplicity of channelized liquid transfer means are provided, extending through the perforated deck 50 at the sole means for transfer of continuous phase liquid from a contacting zone on the bottom side of the tray to a contacting zone on the top side thereof. The upcomer liquid transfer means 57, 58, 59, 60 and 61 are aligned in rows extending across the tray and are transversely spaced in parallel relationship to each other. In this manner, the perforated deck 50 is divided into sections 51, 52, 53, 54, 55 and 56. In this manner, the liquid transfer means are distributed such that they each serve an approximately equal perforated deck area of the adjacent tray from which the discontinuous phase liquid is being dispersed into the contacting zone receiving continuous phase liquid from the liquid transfer means.

The liquid transfer means 57, 58, 59, 60 and 61 comprise the associated settling sections 62, 63, 64, 65 and 66, respectively. The details of the liquid transfer means of this embodiment will be described below by reference to upcomer 58, which is similar to basic structure to the upcomers in the other rows.

The settling section 63 of upcomer 58 is formed by imperforate enclosing wall means extending vertically downwardly from said tray deck bottom side to a uniform extent and open at the bottom end to provide an inlet to the settling section. As discussed earlier herein, the function of the settling section is to permit disengagement of the discontinuous phase liquid from the liquid being transferred. The enclosing wall means for the settling section 63 comprise side walls 42 longitudinally extending across the tray and transverse end walls 43 disposed at right angles with respect to the side walls whereby the settling section has a rectangular cross-section over its entire vertical extent. A multiplicity of pressure drop sections 67, 68, 69 and 70 are vertically aligned with the settling section 63. Each pressure drop section is formed by enclosing wall means extending vertically upwardly from the tray deck top side to a uniform extent and imperforate at least along the base part thereof adjacent the perforated deck. The enclosing wall means comprise longitudinally extending side walls 74 and transverse end walls 75 disposed at right angles with respect to the side walls. Each of the pressure drop sections thus has a rectangular cross section over its entire vertical extent. Such rectangular geometries of the settling and pressure drop sections are preferred in practice for large diameter trays for ease of fabrication. The constituent pressure drop sections of the liquid transfer means each has a smaller cross-sectional area than that of the associated settling section and is joined in closed flow communication therewith to provide a sudden contraction in cross-sectional area from the settling section to the pressure drop section substantially in the plane of the perforated deck 50. Each of the pressure drop sections in the row are longitudinally spaced apart to provide for uniform distribution of the coalescent discontinuous phase liquid on the tray.

The liquid transfer means of this tray also feature fixedly positioned liquid discharge openings 71 in the upper part of each of the pressure-drop sections, for passage of transferred liquid to the contacting zone on the top side of the tray. These openings comprise a multiplicity of slotted apertures in the longitudinally extending side wall upper parts. Imperforate cover means 72 are disposed at the outer end of the pressure-drop sections for vertical sealing thereof against discontinuous phase liquid in the contacting zone on the top side of the tray, to prevent discontinuous phase liquid droplets from falling through the upcomer and bypassing the tray. The imperforate cover means 72 comprise a plate member having a horizontally disposed flat portion overlying and joined to the uppermost ends of the pressure drop section enclosing walls. A peripheral portion 73 of the cover means depends away from the horizontally disposed flat portion and toward the tray deck, for deflection of discontinuous phase liquid impinging on the cover away from the liquid discharge openings 71. In some instances, as for example where the discontinuous phase liquid does not freely wet of the material of construction of the cover means, the downwardly depending peripheral portion 73 of the cover means may suitably be deleted.

In this embodiment each of the fixedly positioned liquid discharge openings 71 is arranged to discharge the transferred liquid in a substantially horizontal direction. Preferably, the total liquid discharge opening cross-sectional area for the liquid transfer means is substantially equal to the cross-sectional area of the settling section of the liquid transfer means. This is to prevent excessively high velocities in the transferred liquid being discharged from the pressure drop section. The ratio of the cross-sectional area of each pressure drop section to the associated cross-sectional area of the settling section is desirably in the aforementioned range of 0.1 to 0.8. As used in this context, the "associated cross-sectional area" of the settling section, $A_a$, is defined by:

$$A_a = (A_i/A_p) \times A_s$$

where
$A_i$ = cross-sectional area of the pressure drop section considered,
$A_p$ = total cross-sectional area of all pressure drop sections of the liquid transfer means, and
$A_s$ = total cross-sectional area of the settling section.
In other words, the associated cross-sectional area of the settling section is the cross-sectional area of that segment or section of the settling section which bears the same ratio to the total cross-sectional area of the settling section as the cross-sectional area of the pressure drop section considered bears to the total cross-sectional area of all pressure drop sections joined with that settling section. Accordingly, the associated cross-sectional area may be considered as defining a liquid flow area in the settling section through which the transferred liquid passing to a given pressure drop section must flow.

Each of the respective liquid transfer means in FIG. 5 is mechanically joined to the adjacent perforated deck portions by means of longitudinal fastener strips 76 and nut-bolt fasteners 77, in a manner as described more fully hereinbelow. To facilitate fabrication of the tray shown in FIG. 5, the upcomers do not extend from edge-to-edge of the tray, but terminate a short distance inward from the edge leaving a space which may be occupied by a perforated plate or by a non-perforated filler plate 78, as shown. Inasmuch as the area occupied by spaces between the ends of the multiple liquid transfer means and the edges of the tray will constitute a very minor portion of the total tray area, the use of the non-perforated filler plates will have no significant effect on the performance of the tray.

From a structural standpoint, the upcomers in the FIG. 5 tray configuration, extending longitudinally across the tray substantially from one edge of the tray to an opposite edge, serve the function of mechanically supporting the tray. Thus the liquid transfer means become structural components of the tray that stabilize the adjacent perforated deck sections and make the tray self-supporting. As discussed earlier herein, it has been the practice of the prior art to dispose beams extending transversely across the tray for support and mechanical strength, a practice which results in the occlusion of large portions of the tray surface by the support beams, so that a significant amount of the tray's cross-sectional area is lost for contacting purposes. The tray configuration of FIG. 5 avoids such difficulty and accordingly permits a relatively larger portion of the cross-sectional area to be utilized as active area for discontinuous phase liquid coalescence and subsequent discharge for contacting.

In accordance with the present invention, the liquid transfer means is constructed such that the pressure drop section has a smaller cross-sectional area than the settling section and is joined in closed flow communication therewith to provide a sudden contraction is cross-sectional area from the settling section to the pressure drop section substantially in the plane of the perforated deck, for reduction of pressure in the liquid flowed therethrough. As a feature of the present invention, it is essential that the sudden contraction of the liquid transfer means be located at about the level of the perforated deck. If the sudden contraction is cross-sectional area were provided either substantially above or below the plane of the perforated deck, the resultant tray configuration would be characterized by serious operational deficiencies relative to the configuration of the present invention. For example, assuming the liquid transfer means to be of the upcomer type, if the sudden contraction in cross-sectional area were provided substantially below the plane of the perforated deck, then the resulting semi-enclosed volumes bounded by the settling section upper portion, the pressure drop section base portion and the under side of the perforated deck would be prone to stagnancy, serving to trap and retain the respective liquid phases, particularly the discontinuous phase liquid droplets, passing into those regions. The presence of such dead spaces may tend to severely lower the contacting efficiency of the overall system.

On the other hand, if the sudden contraction in the upcomer is located substantially above the plane of the perforated deck, then the larger cross-sectional area settling section extending upwardly through the perforated deck will occlude a large portion of the area on the top side of the tray deck. Under such conditions, a smaller area is provided on the tray for distribution of the coalescent discontinuous phase liquid layer; accordingly, with a given volume of the coalescent liquid distributed within a smaller tray surface area, a greater variation in height of the coalescent liquid layer will occur with change in liquid loading in the system than will occur on a tray constructed in accordance with the present invention. As discussed earlier herein, it is desirable to minimize the variation in height of this liquid layer with variation in liquid loading, in order to insure operating stability of the tray. Furthermore, with the sudden contraction in the upcomer structure located above the tray, the more or less horizontal surface of the upcomer structure formed by the sudden contraction will serve to catch the falling drops of the discontinuous phase liquid, thus providing a dead space or "holdup" of the discontinuous phase which may significantly reduce the mass transfer efficiency of the system. Although the preceding discussion has been directed to upcomer liquid transfer means, it will be recognized that analogous considerations apply to downcomer liquid transfer means. Accordingly, the structure of the liquid transfer means of this invention, characterized by a sudden contraction in cross-sectional area from the settling section to the pressure drop section substantially in the plane of the perforated deck, permits highly uniform distribution of the coalescent discontinuous phase liquid on the tray, stable operation even under variant liquid loading conditions and uniform liquid residence time distribution in the contacting system without stagnance or "holdup" behavior.

Figure 6:
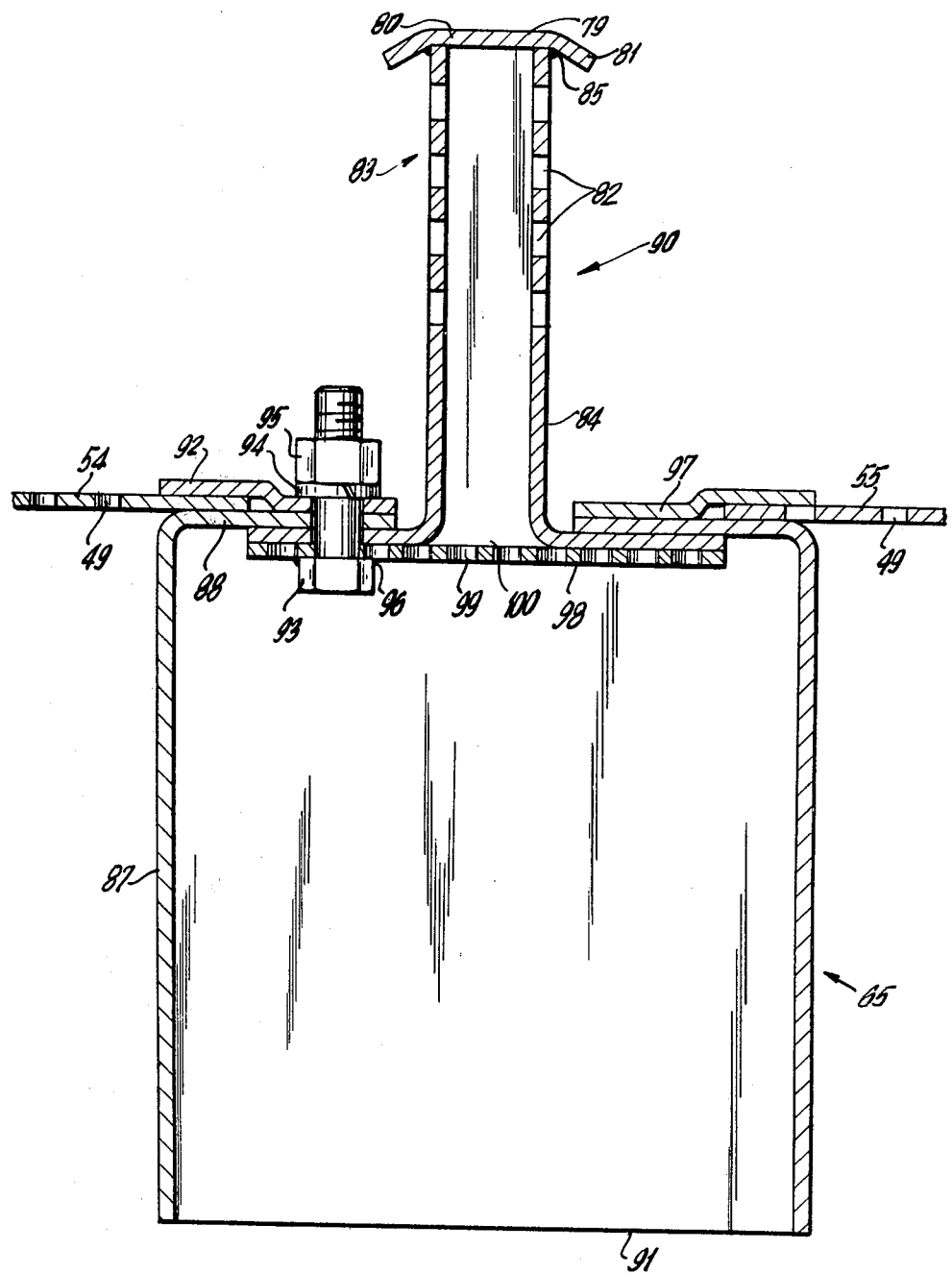
FIG. 6 is a cross-sectional elevational view of a portion of liquid transfer means of the contacting tray shown in FIG. 5, along the line A—A.

FIG. 6 is a cross-sectional elevational view of a portion of liquid transfer means of the contacting tray shown in FIG. 5, along the line A—A. As shown, the settling section 65 of the liquid transfer means is formed by imperforated enclosing walls 87 extending vertically downwardly from the tray deck bottom side and open at the bottom end to provide an inlet 91 to the settling section. Pressure drop section 90 is vertically coaxially aligned with the settling section and is formed by the enclosing walls 84 extending vertically upwardly from said tray deck top side. The enclosing walls of the pressure tray section are imperforate along the base part thereof adjacent the perforated deck, with the pressure drop section having a smaller cross-sectional area than the settling section and joined in closed flow communication with the latter to provide a sudden contraction in cross-sectional area substantially in the plane of the perforated deck. In the upper parts 83 of the longitudinally extending side walls 84 of the pressure drop section, the fixedly positioned liquid discharge openings 82, comprising a multiplicity of slotted apertures, are provided for discharge of the transferred liquid from the upcomer to the adjacent contacting zone on the top side of the tray. The imperforate cover means 79 is disposed at the upper end of the pressure-drop section 90 for vertical sealing thereof against discontinuous phase liquid in the adjacent contacting zone. This imperforate cover means comprises a plate member having a horizontally disposed flat portion 80 overlying and joined to the upper ends of the pressure drop section enclosing wall means as by welds 85, and a peripheral portion 81 depending away from the horizontally disposed flat portion and toward the tray deck surface.

The liquid transfer means is structurally joined to the perforated deck by nut and bolt fasteners as shown, with the sudden contraction in the upcomer being formed in part by the horizontally disposed closure wall segment 88 enclosing the periphery of the settling section 65 at its upper end. The closure wall segment on the left hand side of the upcomer as illustrated mates on the periphery of its top surface with perforated deck section 54 having perforations 49 therein. The perforated deck section is retained in place by the fastener strip member 92. In like fashion the closure wall segment on the right hand side of the upcomer mates on its top surface with deck section 55 and the latter is secured by fastening strip 97 (bolt and nut fasteners not shown).

On its bottom surface, the closure wall segments 88 mates with the horizontal flange extension of the pressure drop section side walls. The pressure drop plate 98 is in turn positioned as shown beneath the flange wall extensions. The purpose of the pressure drop plate is to provide further reduction of pressure in the liquid passed through the pressure drop section and flowing through the restricted orifice openings 99. The plate is thus disposed substantially horizontally and proximate the inlet 100 of the pressure drop section 90 at the sudden contraction from the settling section to the pressure drop section. The entire assembly, comprising pressure drop plate 98, flange extension 89, closure wall segment 88, perforated deck section 54 and fastener strip 92, is structually connected by bolt 93 passing through the respective elements and secured in place by lock washer 94 and nut 95. To insure additional rigidity of the assembly, the bolt 93 may be welded to the pressure drop plate as at 96.

Figure 7:
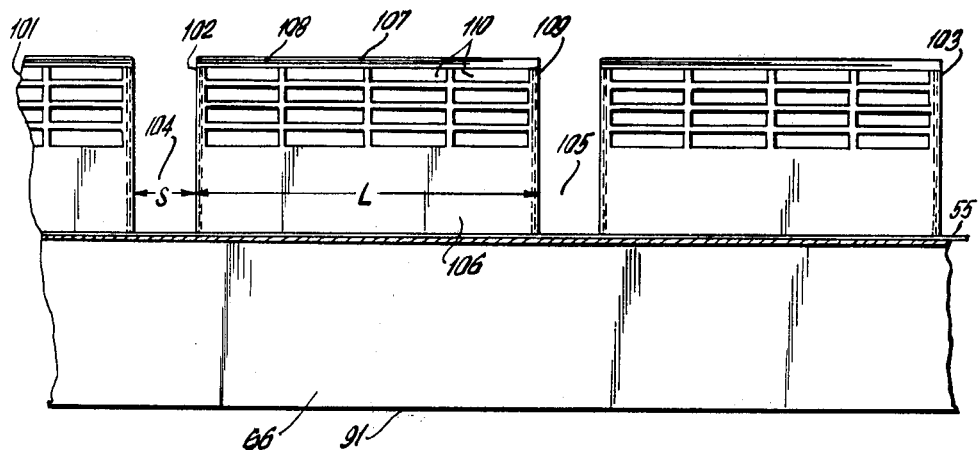
FIG. 7 is an elevational view of a section of a liquid transfer means of the contacting tray shown in FIG. 5, along the line B—B.

FIG. 7 is an elevational view of a section of a liquid transfer means of the contacting tray shown in FIG. 5, along the line B—B. The section shows the details of liquid transfer means 61 extending through the deck section 55 as comprising a single settling section 66 having open bottom end inlet 91. The settling section is joined with the multiple longitudinally spaced apart pressure drop sections 101, 102 and 103, each having enclosing wall means comprising longitudinally extending side walls 106 and transverse end walls 109 disposed at right angles with respect to the side walls whereby each of the constituent pressure drop sections has a rectangular cross-section over its entire vertical extent.

Each of the pressure drop sections has slotted aperture liquid discharge openings 110 in the upper parts of the side walls 106 and imperforate covers 107 with downwardly depending peripheral portions 108 positioned over the upper ends of the longitudinal and side walls of the pressure drop section, which extend vertically upwardly to the same height. As shown, the pressure drop sections in the row are longitudinally uniformly spaced apart to provide for uniform distribution of the coalescent discontinuous phase liquid in the layer thereof on the perforated deck during operation. In large diameter trays, e.g., greater than 4 feet in diameter, of the type shown in FIG. 5, the tray is preferably constructed so that the length of the pressure drop section, as measured by the longitudinal dimension L of the side walls, is no greater than 24 inches and the pressure drop sections are longitudinally spaced apart at a distance S of between 2 and 4 inches. The purpose of such dimensional characteristics is to provide for uniform distribution of the coalescent liquid on the tray deck during operation.

Figure 8:
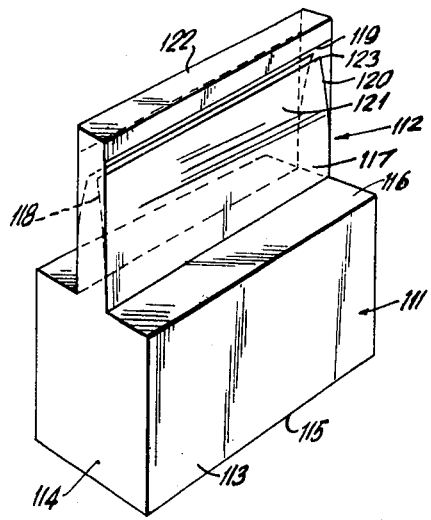
FIG. 8 is an isometric drawing of another type of liquid transfer means for a contacting tray according to the invention.

FIG. 8 is an isometric drawing of another type of liquid transfer means for a contacting tray according to the invention. The liquid transfer means comprises a settling section 111 formed by vertical side walls 113 and end walls 114. The settling section is open at its lower end to provide an inlet 115 for the liquid to be transferred. Vertically aligned with the settling section 113 is pressure drop section 112, enclosed by longitudinally extending side walls 117 and the upper sections of the end walls 114, which are common with the settling section 111. The sudden reduction in cross-sectional area from the settling section to the pressure drop section is provided by means of the horizontal closure members 116 each extending from the lower end of the pressure drop section side wall 117 transversely to the upper end of the settling section side wall 113 lying in the same horizontal plane. Imperforate cover 122 in joined to the upper ends of the pressure drop section enclosing walls 114 and 117. The fixedly positioned liquid outlet openings in this embodiment of the invention are formed by a pair of planar flaps 121. Each flap has an uppermost free edge 123 in a horizontal plane and the flaps are cut from corresponding portions of the side wall 117 upper parts along the cuts 118-119-120. These cut flaps are deformed to an equal extent into the interior of the pressure drop section such that the uppermost edges of the corresponding planar flaps are disposed in spaced relationship to each other in the interior of the pressure drop section. Although only one pair of flaps is employed in this embodiment, it may in some instances be desirable to employ multiple pairs of planar flaps to form the fixedly positioned liquid discharge openings for the liquid transfer means.

Figure 8A:
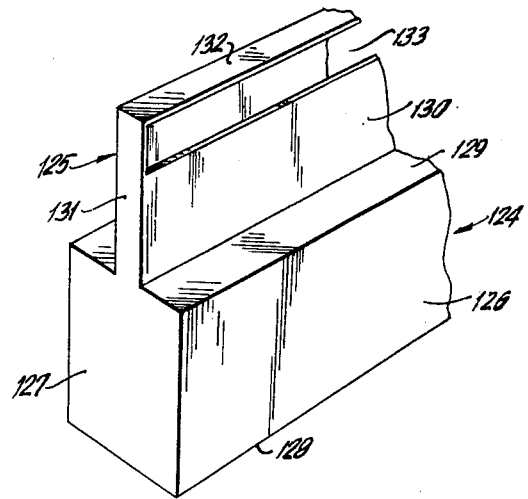
FIG. 8A is an isometric drawing of still another configuration of a liquid transfer means for a contacting tray according to the invention.

FIG. 8A is an isometric drawing of still another configuration of liquid transfer means for a contacting tray according to the invention. The liquid transfer means in this embodiment includes a settling section 124 formed by vertical side walls 126 and end walls 127. The settling section is open at its lower end to form liquid inlet 218. Pressure drop section 125 is vertically aligned with the settling section, enclosed by longitudinally extending side walls 130 and the upper sections 131 of the common end wall 127. The sudden reduction in cross-sectional area from the settling section to the pressure drop section is provided by horizontal closure members 129. Imperforate cover 132 is joined to the upper ends of the pressure drop section enclosing walls 130 and 131. The fixedly positioned liquid discharge openings in this embodiment 133 are simply formed by the termination of the vertically extending side walls 130 at a level below the horizontal plane of the imperforate cover means 132. Both of the embodiments in FIGS. 7 and 7A may suitably be incorporated into the tray structure by the joining of perforated deck sections to the horizontal closure members 129, as for example by welding or by bolting as earlier described in connection with FIG. 5.

Figure 9:
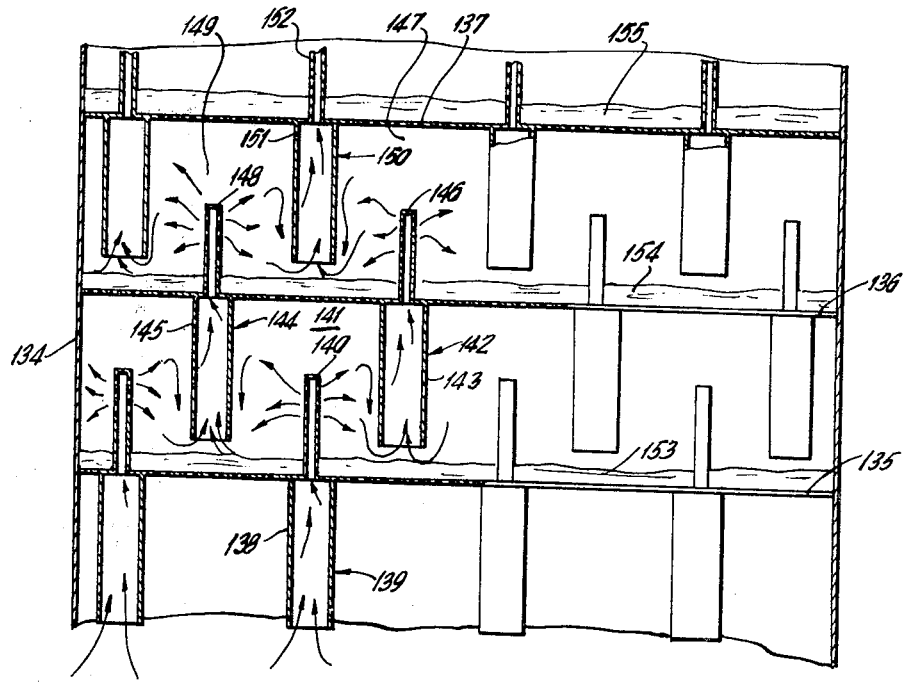
FIG. 9 is a schematic elevational view of a section of a contacting column embodiment of the invention employing contacting trays of a type as shown in FIGS. 5–8 illustratively showing the liquid phase flows therein.

FIG. 9 is a schematic elevational view of a section of a contacting column embodiment of the invention employing contacting trays of a type as shown in FIGS. 5-8, illustratively showing the continuous liquid phase flows therein.

The contacting column comprises a cylindrical casing 134 in which the liquid-liquid contacting trays 135, 136 and 137 are mounted. These trays are horizontally disposed and mounted in vertically displaced relationship with respect to each other to form contacting zones between the adjacent trays and such that the liquid transfer means of adjacent contacting trays are in laterally spaced relationship with respect to each other. In operation, the lighter continuous phase liquid in upcomer 138 of tray 135 flows from settling section 139 upwardly into pressure drop section 140 and is discharged in a substantially horizontal direction from the fixedly positioned liquid discharge openings into the inter-tray contacting zone 141. The pressure drop in the continuous phase flowing through the upcomer together with the discontinuous phase liquid pressure drop across the tray determines the height of the coalescent discontinuous phase liquid layer 153 on the tray deck.

The discharged liquid in contacting zone 141 flows horizontally and is contacted with discontinuous phase liquid droplets falling through the contacting zone from the coalescent discontinuous phase liquid layer 154 on the next overlying tray 136. The contacted continuous phase liquid then flows downwardly along the walls of the laterally spaced apart settling sections 142 and 144 of upcomers 143 and 145, respectively, and enters the upcomers for flow therethrough. The respective transferred liquid streams are discharged from the adjacent pressure drop sections 146 and 148 of these upcomers, for flow across the respective contacting zones 147 and 149. At the bottom end of upcomer 151, these flows converge, entering the upcomer and flowing consecutively through the settling section 150 and pressure drop section 152 thereof. The liquid is in turn discharged from the upcomer 151 for contacting with the discontinuous phase liquid droplets falling to form the coalescent discontinuous phase liquid layer 155 on tray 137. In this fashion, the liquid phases pass through the entire column and are intimately contacted in each of the serial contacting zones therein.

Figure 10:
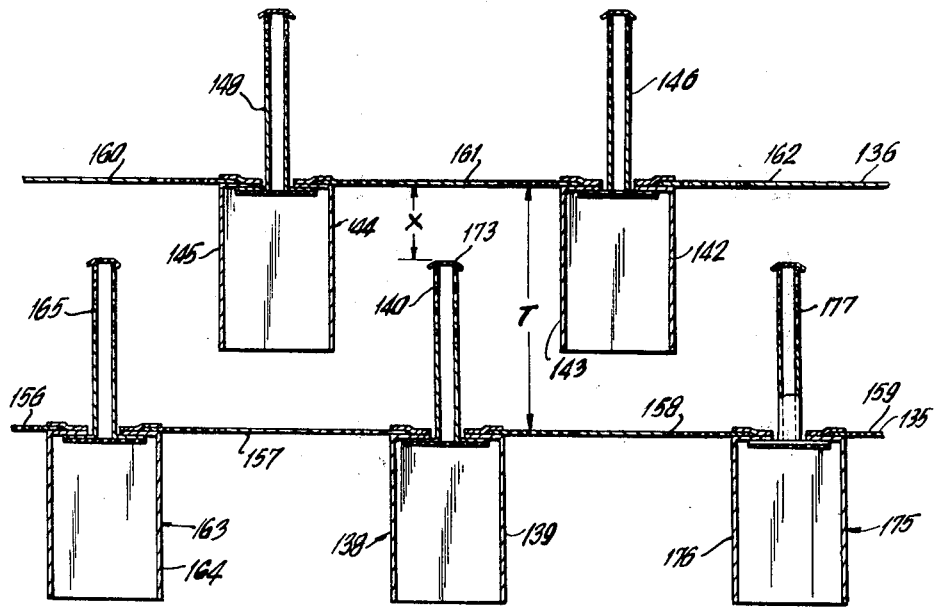
FIG. 10 is an elevational view of a section of the contacting column of FIG. 9.

FIG. 10 is an elevational view of a section of the contacting column of FIG. 9 including lower contacting tray 135 and upper contacting tray 136. Lower tray 135 includes the perforated deck sections 156, 157, 158 and 159, with upcomers 163, 138 and 176 comprising the settling sections 164, 139 and 175 and the pressure drop sections 165, 140 and 177, respectively. The upper tray 136 is fabricated from perforated deck sections 160, 161 and 162, with upcomers 145 and 143 extending through the perforated deck comprising settling sections 144 and 142 and pressure drop sections 148 and 146, respectively. As shown, the enclosing wall means of each settling section and each pressure drop section of the respective upcomers are vertically uniformly extended such that the respective settling sections and pressure drop sections of adjacent contracting trays extending into the same contacting zone and terminating in the zone have a vertical dimension representing the sum of pressure drop section and settling section heights which is a least equal to the vertical spacing T between the adjacent trays. For example, in a tray of the type shown in FIG. 9, having a diameter of 8.0 feet, the spacing T between consecutive trays may be on the order of 14 inches, with the settling sections of the upcomers having a vertical dimension (height) of 8.0 inches and the pressure drop sections having a height of about 8.0–10.0 inches. The liquid transfer means in this system are suitably transversely spaced apart at a distance of approximately 16.7 inches from one another, as measured horizontally between the vertical axes of the adjacent upcomers, with the liquid transfer means of the adjacent contacting trays in laterally spaced relationship with respect to each other. In the foregoing example, the vertical distance X between the outer ends of the pressure drop sections and the perforated deck of the adjacent contacting tray is designed so as not to be less than 3.0 inches. This spacing limit is especially preferred in practice where trays of the type shown in FIG. 9 are employed for extraction of aromatics from hydrocarbon feeds with glycol gased solvents, although spacings either greater than or less than this limit may be desirable in the contacting of other liquid streams.

The following examples are illustrative of the practice of the invention wherein liquid-liquid contacting trays constructed in accordance with the invention are employed for the contacting of hydrocarbon feed mixtures with tetraethylene glycol solvent for extraction of aromatic hydrocarbons from the feed mixture. It is to be recognized that the applicability of the invention is not specifically limited to such extraction process and that the tray of this invention may suitably be employed in any liquid-liquid contacting system wherein perforated liquid-liquid contacting trays are conventionally employed.

EXAMPLE 1

A liquid-liquid contacting column similar to that shown in FIG. 3 was constructed having a vertically extended cylindrical outer casing with an inner diameter of 12.0 inches and height of 16.0 feet, fabricated from carbon steel of 0.375 inch thickness. The column contained 8 liquid-liquid contacting trays constructed in accordance with the invention and of the type as generally shown in FIG. 1 featuring a single upcomer continuous phase liquid transfer means. The trays were horizontally disposed, i.e., the trays were positioned with the perforated decks of the trays lying in a horizontal plane, and mounted in vertically displaced relationship with respect to each other to form intertray contacting zones. The spacing between adjacent trays was approximately 14.0 inches and the trays were positioned such that the upcomers on the serial adjacent trays were laterally displaced from one another at opposite sides of the alternate trays in the manner shown in FIG. 3. The perforated deck of each tray in the column comprised an active area of 70.4 in.$^2$ and the overall cross-sectional area of the trays was 113.0 in.$^2$, as based on the cross-sectional area of the column in the horizontal plane of the perforated deck. Each perforated deck had a total open (perforation) cross-sectional area of 21.1 in.$^2$, formed by $\frac{1}{4}$ inch diameter perforations uniformly distributed across the active surface of the tray in a triangular pattern. The upcomer on each tray had an overall height of 18.0 inches, as measured vertically from the inlet of the settling section to the cover of the pressure drop section, corresponding to a height of 8.0 inches for the settling section and a height of 10.0 inches for the pressure drop section. The cross-sectional area of the settling section was 24.5 in.$^2$ and the cross-sectional area of the pressure drop section was 5.75 in.$^2$, as measured in a horizontal plane in each of the respective sections, and the cross-sectional area of the liquid discharge openings for each upcomer was 22.3 in.$^2$. A pressure drop plate was disposed at the inlet to the pressure drop section, comprising a horizontally disposed perforated plate with $\frac{1}{8}$ inch diameter perforations uniformly distributed across the plate in a triangular pattern and having a center-to-center distance between adjacent perforations of 7/32 inch.

In operation of the above-described column, a hydrocarbon feedstock stream, containing 50.5% aromatic constituents by volume was introduced into the column below the lowermost tray in the column, at a flow rate of 5.7 GPM and a temperature of 125° F. Simultaneously, a tetraethylene glycol solvent comprising 90.3 volume % tetraethylene glycol solvent and 9.7 volume % water was introduced at the top of the column, above the uppermost tray, at a flow rate of 35.0 GPM and a temperature of 278° F.

In the column, which was maintained at a pressure of 110 psig, the heavier hydrocarbon feedstock and lighter tetraethylene glycol solvent were passed through the sequential contacting zones in the column in a generally countercurrent manner for mass exchange to effect a transfer of the aromatic constituents of the hydrocarbon stream to the discontinuous solvent phase. Aromatic component-depleted raffinate was withdrawn at the top of the column at a rate of 4.0 GPM and temperature of 240° F. The aromatic component-enriched solvent was withdrawn from the bottom of the column at a flow rate of 36.8 GPM and a temperature of 225° F. An analysis of the feed, rich solvent and raffinate streams for the above-described process is shown in Table I.

TABLE I

| | Vol. % Composition of Process Streams | | |
|---|---|---|---|
| Component | Feed | Rich Solvent | Raffinate |
| Mixed Benzenes[1] | 38.8 | 3.9 | 0.9 |
| Toluene | 8.1 | .9 | 1.7 |
| Xylene | 1.7 | .3 | 0.8 |
| C$_9$-Aromatics | 1.9 | .3 | 2.6 |
| Cyclohexane | 30.3 | 1.4 | 57.1 |
| n-Hexane | 19.2 | .9 | 36.9 |

[1] Benzene, ethyl benzene and propyl benzene.

The foregoing measurements show that approximately 60 vol. % extraction of aromatic components from the hydrocarbon feed stream was achieved in the above-described system.

EXAMPLE 2

The following description is based on a contacting column employing trays of the type shown in FIGS. 5-8 mounted in vertically displaced relationship in the column as shown in FIGS. 9-10. The contacting column has an inner diameter of 8.0 feet and is 96.8 feet high, containing 70 liquid-liquid contacting trays. These trays have an active perforated deck area of 31.9 ft$^2$, corresponding to approximately 63.0% of the total cross sectional area of the tray. Perforations having a diameter of ¼ inch are uniformly distributed across the perforated deck in a triangular pattern.

Each tray has a multiplicity of upcomers extending through the perforated deck, arranged in rows extending across the tray substantially from edge to edge and transversely spaced 16.7 inches apart in parallel relationship to each other. Five rows of upcomers are provided (identified hereinafter as transversely consecutive rows 1, 2, 3, 4 and 5, with rows 1 and 5 being positioned at the opposite lateral extremities of the tray), each upcomer comprising a settling section formed by longitudinally extending side walls and transverse end walls whereby the settling section has a rectangular cross-section. The lengths of the individual settling sections, as measured along the longitudinally extending side walls thereof, are 5.3, 7.1 7.5, 6.4 and 3.6 ft., corresponding to the upcomers in rows 1, 2, 3, 4 and 5, respectively. These settling sections are each 5.5 inches in width and have a height, as measured vertically from the perforated deck to the inlet of the settling section, of 8.0 inches.

A multiplicity of pressure drop sections are vertically aligned with each of the respective settling sections, being formed by enclosing wall means extending vertically upwardly from the tray deck top side to a uniform height of between 8 and 10 inches. These enclosing wall means comprise longitudinally extending side walls and transverse end walls disposed at right angles with respect to the side walls whereby each pressure drop section has a rectangular cross section. The number of pressure drop sections in each row is as follows: row 1=4, row 2=5, row 3=5, row 4=5 and row 5=4. These drop sections each have a width of 1.0 inch and the pressure drop sections within each row are longitudinally spaced apart at a distance of 3.0 inches, as measured between the facing end walls of adjacent pressure drop sections. Fixedly positioned liquid discharge openings are disposed in the upper part of each pressure-drop section side wall for passage of transferred liquid to the contacting zone on the top side of the tray, each side wall having openings therein to provide an aggregate cross-sectional opening area for each upcomer which is approximately equal to the cross-sectional liquid flow area of the settling section of the upcomer.

In operation, a hydrocarbon feedstock comprising 86.2% aromatic constituents and 13.8% aliphatic constituents (by volume) is introduced at a flow rate of 293 GPM into the column at a point between trays 50 and 51, as numbered from the top of the column. Simultaneously, a tetraethylene glycol solvent comprising 94.4 vol. % tetraethylene glycol and 5.6 vol. % water is introduced at the top end of the column at a flow rate of 1427 GPM. Raffinate comprising 3.7 vol. % aromatics and 96.3 vol. % aliphatic constituents is withdrawn at the top of the column at a flow rate of 96.0 GPM. The rich solvent, containing 21.2 vol. % extracted aromatics and 7.8 vol. % aliphatic components, is withdrawn from the bottom of the column at a flow rate of 1095 GPM. This withdrawn rich solvent is passed to a distillation system for separation therein into lean solvent, which is recirculated to the liquid-liquid contacting column as the solvent stream therefor, and solvent-free extract containing the extracted aromatic constituents from the hydrocarbon feedstock. A portion of the solvent-free extract, comprising 42.6 vol. % aromatics, is recycled to the contacting column and introduced at the bottom end thereof as reflux to enhance the extraction process.

Although preferred embodiments have been described in detail, it will be further appreciated that other embodiments are contemplated only with modification of the disclosed features, as being within the scope of the invention.

What is claimed is:

1. A liquid-liquid contacting tray for use in a contacting column including a casing in which a plurality of such trays are disposed, vertically spaced apart from one another to form contacting zones between adjacent trays, comprising a horizontally disposed perforated deck having main top and bottom sides providing a major portion of the tray surface area for discharge of coalesced discontinuous phase liquid at one of said sides of said deck through the perforations therein from a layer of coalescent discontinuous phase liquid supported on the other said sides of said deck, at least one channelized liquid transfer means extending through said deck as the sole means for transfer of continuous phase liquid from a contacting zone on one side of said tray to a contacting zone on the other side thereof, each liquid transfer means comprising: a settling section formed by imperforate enclosing wall means, distinct from said contacting column casing, extending vertically outwardly from said tray deck one side, terminating in said contacting zone on said tray deck one side and open at the vertically outermost end to provide an inlet to said settling section, for disengagement of the discontinuous phase liquid from the transferred continuous phase liquid; a pressure drop section vertically aligned with said settling section, formed by enclosing wall means, distinct from said contacting column casing, extending vertically outwardly from said tray deck other side, terminating in said contacting zone on said tray deck other side and imperforate on the base part thereof adjacent said perforated deck, with said pressure drop section having a smaller cross-sectional area than said settling section and joined in closed flow communication therewith to provide a sudden contraction in cross-sectional area from said settling section to said pressure drop section substantially in the plane of said perforated deck for reduction of pressure in the liquid flowed therethrough; at least one fixedly positioned liquid discharge opening in the enclosing wall means at the vertically outer part of said pressure-drop section, arranged to provide generally horizontally directed passage of transferred liquid from said pressure drop section to the contacting zone on said other side of said tray; and imperforate cover means, not including any imperforate portion of an adjacent tray deck, leaktightly joined to the vertically outer end of said pressure-drop section for vertical sealing thereof against discontinuous phase liquid in the contacting zone on said other side of said tray.

2. Apparatus according to claim 1 wherein said pressure drop section and said settling section are coaxially aligned.

3. Apparatus according to claim 1 wherein said enclosing wall means of said settling section and said pressure drop section of each said liquid transfer means comprise side and end wall portions disposed at right angles with respect to each other whereby each said liquid transfer means has a rectangular cross-section in the horizontal plane over its entire vertical extent.

4. Apparatus according to claim 1 with a plurality of liquid transfer means aligned in rows extending across said tray and transversely spaced in parallel relationship to each other.

5. Apparatus according to claim 4 wherein said enclosing wall means of said settling section and said pressure drop section of each said liquid transfer means comprise side walls longitudinally extending across said tray and transverse end walls disposed at right angles with respect to said side walls whereby each said liquid transfer means has a rectangular cross-section over its entire vertical extent.

6. Apparatus according to claim 4 wherein the liquid transfer means in each said row comprise a single settling section whose enclosing wall means comprise side walls longitudinally extending across said tray and transverse end walls disposed at right angles with respect to said side walls whereby each said settling section has a rectangular cross-section over its entire vertical extent, each said settling section being joined with a multiplicity of longitudinally spaced apart pressure drop sections each having enclosing wall means comprising longitudinally extending side walls and transverse end walls disposed at right angles with respect to said side walls whereby each said pressure drop section has a rectangular cross-section over its entire vertical extent.

7. Apparatus according to claim 6 wherein the pressure drop sections in each said row are longitudinally uniformly spaced apart to provide for uniform distribution of coalescent discontinuous phase liquid in the layer thereof on said perforated deck.

8. Apparatus according to claim 1 with means for further reduction of pressure in the liquid passed through each said pressure drop section comprising a flat perforated plate disposed substantially horizontally and proximate the inlet of said pressure drop section at said sudden contraction from said settling section to said pressure drop section.

9. Apparatus according to claim 1 wherein the ratio of the cross-sectional area of said pressure drop section to the cross-sectional area of said settling section is in the range of 0.10 and 0.80.

10. Apparatus according to claim 3 wherein said at least one fixedly positioned liquid discharge opening comprises at least one slotted aperture in a pressure drop section side wall.

11. Apparatus according to claim 3 with said liquid transfer means having fixedly positioned liquid outlet openings formed by at least one pair of planar flaps, each said pair comprising flaps having a vertically outermost free edge in a horizontal plane, cut from corresponding portions of the side wall upper parts of said pressure drop section and deformed into the interior thereof such that said vertically outermost edges of corresponding planar flaps are in spaced relationship to each other in said interior of said pressure drop section.

12. Apparatus according to claim 1 wherein said imperforate cover means comprise a plate member having a horizontally disposed flat portion overlying and joined to the vertically outermost ends of the pressure drop section enclosing wall means and a peripheral portion depending away from said horizontally disposed flat portion and toward the tray surface for deflection of discontinuous phase liquid impinging on said imperforate cover means.

13. Apparatus according to claim 1 wherein the liquid discharge opening cross-sectional area is substantially equal to the cross-sectional area of said settling section.

14. Apparatus according to claim 6 wherein the length of said pressure drop section, as measured by the longitudinal dimension of said side walls, is no greater than 24 inches and said pressure drop sections are longitudinally spaced apart at a distance of between 2 and 4 inches.

15. A liquid-liquid contacting tray for use in a contacting column including a casing in which a plurality of such trays are disposed, vertically spaced apart from one another to form contacting zones between adjacent trays, comprising: a horizontally disposed perforated deck having main top and bottom sides providing a major portion of the tray surface area for discharge of coalesced discontinuous phase liquid at one of said sides of said deck through the perforations therein from a layer of coalescent discontinuous phase liquid supported on the other of said sides of said deck, and a multiplicity of channelized liquid transfer means extending through said perforated deck as the sole means for transfer of continuous phase liquid from a contacting zone on said one side of said tray to a contacting zone on said other side thereof, aligned in rows extending across said tray and transversely spaced in parallel relationship to each other, each liquid transfer means comprising: a settling section formed by imperforate enclosing wall means distinct from said contacting column casing, extending vertically outwardly from said tray deck one side to a uniform extent, terminating in said contacting zone on said tray deck one side and open at the vertically outermost end to provide an inlet to said settling section, for disengagement of the discontinuous phase liquid from the transferred continuous phase liquid, said enclosing wall means comprising side walls longitudinally extending across said tray and transverse end walls disposed at right angles with respect to said side walls whereby said settling section has a rectangular cross-section over its entire vertical extent; a multiplicity of pressure drop sections vertically aligned with said settling section, each formed by enclosing wall means, distinct from said contacting column casing, extending vertically outwardly from said tray deck other side to a uniform extent, terminating in said contacting zone on said tray deck other side and imperforate along the base part thereof adjacent said perforated deck, said enclosing wall means comprising longitudinally extending side walls and transverse end walls disposed at right angles with respect to said side walls whereby each said pressure drop section has a rectangular cross section over its entire vertical extent, with the pressure drop sections having a smaller cross-sectional area than said settling section and joined in closed flow communication therewith to provide a sudden contraction in cross-sectional area from said settling section to said pressure drop sections substantially in the plane of said perforated deck for reduction of pressure in the liquid flowed therethrough; fixedly positioned liquid discharge openings in the side walls at the vertically outer part of each said pressure drop section, arranged to provide generally horizontally directed passage of transferred liquid from said pressure drop sections to the contacting zone on said other side of said tray; and imperforate cover means, not including and imperforate portion of an adjacent tray deck, leak-tightly joined to the vertically outer end of said pressure drop section for vertical sealing thereof against discontinuous liquid in the contacting zone on said other side of said tray.

16. A liquid-liquid contacting tray for use in a contacting column including a casing in which a plurality of such trays are disposed, vertically spaced apart from one another to form contacting zones between adjacent trays, comprising: a horizontally disposed perforated deck having main top and bottom sides providing a major portion of the tray surface area for discharge of coalesced discontinuous phase liquid at the bottom side of said deck through perforations therein from a layer of coalescent discontinuous phase liquid on the top side of said deck, and at least one channelized liquid transfer means extending through said perforated deck as the sole means for transfer of continuous phase liquid from a contacting zone on said bottom side of said tray to a contacting zone on said top side thereof, each liquid transfer means comprising: a settling section formed by imperforate enclosing wall means, terminating in said contacting zone on said tray deck bottom side and open at the bottom end to provide an inlet to said settling section, for disengagement of the discontinuous phase liquid from the transferred continuous phase liquid; a pressure drop section vertically aligned with said settling section, formed by enclosing wall means, distinct from said contacting column casing, extend-vertically upwardly from said tray deck top side, terminating said contacting zone on said tray deck top side and imperforate along the base part thereof adjacent said perforated deck, with the pressure drop section having a smaller cross-sectional area than said settling section and joined in closed flow communication therewith to provide a sudden contraction in cross-sectional area from said settling section to said pressure drop section substantially in the plane of said perforated deck, for reduction of pressure in the liquid flowed therethrough; at least one fixedly positioned liquid discharge opening in the enclosing wall means at the upper part of said pressure-drop section arranged to provide generally horizontally directed passage of transferred liquid from said pressure drop section to the contacting zone on said top side of said trays; and imperforate cover means, not including any imperforate portion of an adjacent tray deck, leak-tightly joined to the upper end of said pressure-drop section for vertical sealing thereof against discontinuous phase liquid in the contacting zone on said top side of said tray.

17. A liquid-liquid contacting tray for use in a contacting column including a casing in which a plurality of such trays are disposed, vertically spaced apart from one another to form contacting zones between adjacent trays, comprising: a horizontally disposed perforated deck having main top and bottom sides providing a major portion of the tray surface area for discharge of coalesced discontinuous phase liquid at the bottom side of said deck through the perforations therein from a layer of coalescent discontinuous phase liquid supported on the top side of said deck, and a multiplicity of channelized liquid transfer means extending through said perforated deck as the sole means for transfer of continuous phase liquid from a contacting zone on said bottom side of said tray to a contacting zone on said top side thereof, aligned in rows extending across said tray and transversely spaced in parallel relationship to each other, each liquid transfer means comprising: a settling section formed by imperforate enclosing wall means, distinct from said contacting column casing, extending vertically downwardly from said tray deck bottom side to uniform extent, terminating in said contacting zone on said tray bottom side and open at the bottom end to provide an inlet to said settling section, for disengagement of the discontinuous phase liquid from the transferred continuous phase liquid, said enclosing wall means comprising side walls longitudinally extending across said tray and transverse end walls disposed at right angles with respect to said side walls whereby said settling section has a rectangular cross-section over its entire vertical extent; and a plurality of pressure drop sections vertically aligned with said settling section, each formed by enclosing wall means, distinct from said contacting column casing, extending vertically upwardly from said tray deck top side to a uniform extent, terminating in said contacting zone on said tray deck top side and imperforate along the base part thereof adjacent said perforated deck, said enclosing wall means comprising longitudinally extending side walls and transverse end walls disposed at right angles with respect to said side walls whereby each said pressure drop section has a rectangular cross-section over its entire vertical extent, with the pressure drop sections having a smaller cross-sectional area than said settling section and joined flow communications therethrough to provide a sudden contraction in cross-sectional area from said settling section to said pressure drop sections substantially in the plane of said perforated deck for reduction of pressure in the liquid flowed therethrough; fixedly positioned liquid discharge openings in the side walls at the upper part of said pressure drop sections, arranged to provide generally horizontally directed passage of transferred liquid from said pressure drop sections to the contacting zone on the top side of said tray; and imperforate cover means, not including any imperforate portion of an adjacent tray deck, leak-tightly joined to the upper end of each of said pressure-drop sections for vertical sealing thereof against discontinuous phase liquid in the contacting zone on said top side of said tray.

18. Apparatus according to claim 17 with means for further reduction of pressure in the liquid passed through each said pressure drop section comprising flat perforated plate means disposed substantially horizontally and proximate the inlet of each said pressure drop section at said sudden contraction from said settling section to said pressure drop section.

19. A liquid-liquid contacting column comprising a plurality of liquid-liquid contacting trays as defined in claim 1, said trays being horizontally disposed and mounted in vertically spaced relationship with respect to each other to form said contacting zones between the adjacent trays and wherein the liquid transfer means of adjacent contacting trays are in laterally spaced relationship with respect to each other, with said liquid transfer means being vertically aligned with perforated deck portions of the adjacent contacting trays.

20. A liquid-liquid contacting column comprising a plurality of liquid-liquid contacting trays as defined in claim 15, said trays being horizontally disposed and mounted in vertically displaced relationship with respect to each other to form said contacting zones between the adjacent trays and wherein the liquid transfer means of adjacent contacting trays are in laterally spaced relationship with respect to each other, with said liquid transfer means being vertically aligned with perforated deck portions of the adjacent contacting trays.

21. Apparatus according to claim 19 wherein the vertical distance between the outer ends of the pressure drop sections and the perforated deck of the adjacent contacting tray is at least 3.0 inches.

22. Apparatus according to claim 15 wherein said rows extend across said tray substantially from edge to edge theeof, whereby said liquid transfer means serve the function of mechanically supporting the tray.

* * * * *